S. E. NOLD.
COMBINED SPREADER AND CLAMP FOR TIRES.
APPLICATION FILED NOV. 14, 1911.

1,094,164.

Patented Apr. 21, 1914.

Witnesses
F. H. Bishop.
Sylvia Boron.

Inventor
Solomon E. Nold.

By Bond + Miller
Attorneys

UNITED STATES PATENT OFFICE.

SOLOMON E. NOLD, OF ALLIANCE, OHIO, ASSIGNOR TO THE ALUMINUM FOUNDRY COMPANY, OF ALLIANCE, OHIO, A CORPORATION OF OHIO.

COMBINED SPREADER AND CLAMP FOR TIRES.

1,094,164.

Specification of Letters Patent.

Patented Apr. 21, 1914.

Application filed November 14, 1911. Serial No. 660,242.

*To all whom it may concern:*

Be it known that I, SOLOMON E. NOLD, a citizen of the United States, and a resident of Alliance, in the county of Stark and State of Ohio, have invented certain new and useful Improvements in Combined Spreaders and Clamps for Tires, of which the following is a specification.

My present invention relates to improvements in combined spreader and clamp for tires, especially designed for use in connecting the valve stem to the tire proper.

One object of the present invention is to provide a spreader and clamp that can be easily attached and to so form the spreader or clamp plate that practically an air tight joint can be produced without the addition of separate parts and another object is to so form the spreader or clamp plate that it will not injure the inner tube and a still further object is to form the plate of highly non-corrosive material. These objects together with other objects, readily apparent to those skilled in the art, I attain by the construction illustrated in the accompanying drawings, although my invention may be embodied in a variety of other mechanical forms, the construction illustrated being chosen by way of example.

Figure 1:
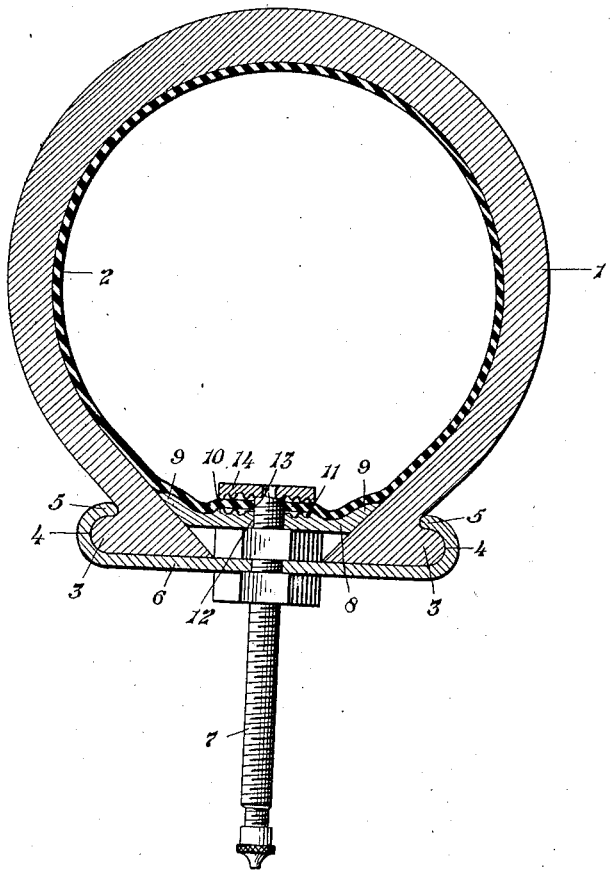
Figure 2:
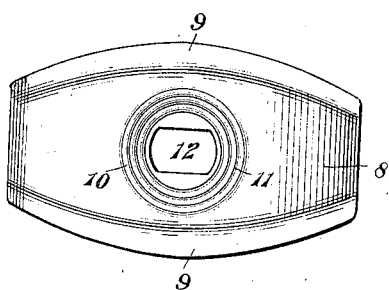
Figure 3:
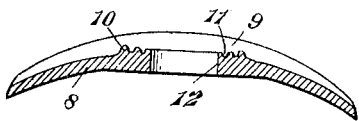

In the accompanying drawings—Figure 1 is a transverse section of the tire showing the parts properly assembled. Fig. 2 is a detached view of the spreader plate or clamp showing its inner side. Fig. 3 is a longitudinal section.

Similar numerals of reference indicate corresponding parts in all the figures of the drawing.

In the accompanying drawing, 1 represents the ordinary tire commonly used in pneumatic tires and within which is located the ordinary inner tube 2. The tire 1 is provided with the usual ribs 3, which ribs are intended to be snugly seated in the grooves 4 formed by the inward curved flanges 5 formed upon the edges of the rim 6. The construction above described is the ordinary construction and has no specific reference to the present invention so far as the detailed construction is concerned. The valve stem 7 is located through the rim, the spreader plate or clamp 8 and the inner tube 2, and is so located so that air can be forced into the inner tube 2 for the usual purpose.

The spreader plate or clamp 8 is so formed as to shape and size that it will fit and press against the inner faces of the tire 1 substantially opposite the ribs 3 so that when said spreader plate is drawn toward the rim 6 it will press the ribs 3 into the grooves 4.

For the purpose of preventing injury to the inner tube 2 and more specifically preventing the cutting of the inner tube in case the tire should become what is commonly known as flat, the extreme upper edges or more specifically the flanges 9 are rounded as best illustrated in Fig. 1. It is well understood that in connecting the valve stem 7 it is necessary to so connect the same that the inner tube will be properly clamped and at the same time an air tight joint provided. It is also well understood that more or less corrosion takes place, consequently it is of importance to provide a spreader plate or clamp of non-corrosive material and in order to provide for this advantage I prefer to form the plate of aluminum so that the spreader plate need not be plated with non-corrosive material or separate plates used at the point of contact as between the spreader plate and the inner tube 2. The inner face of the spreader plate 8 is provided with the ribs and grooves 10 and 11, which ribs and grooves are located around and adjacent to the valve stem aperture 12, through which aperture, said valve stem passes. For the purpose of preventing injury to the inner tube 2 by the clamping action of the spreader plate 8, the outer ribs 10 are formed of greater height so that the greater clamping action or force will be removed a short distance from the aperture 13 formed in the tube 2, thereby preventing any injury and at the same time securely and snugly clamping the inner tube 2 between the spreader plate or clamp 8 and the valve stem head 14, which head is also provided with ribs and grooves as best illustrated in Fig. 1.

It will be understood that by forming the outer ribs 10 somewhat higher the clamping surface of the spreader plate 8 will be slightly concaved or dished, thereby protecting the inner tube 2 at the place where the valve stem 7 is located or in other words protecting the inner tube 2 to such an extent that it will not be easily injured and at the same time forming a practically air tight connection.

It will be understood that the spreader plate 8 should be curved longitudinally so as to properly fit the annular curvature of the tire proper. By forming the spreader or clamp plate 8 of highly non-corrosive material the danger of disintegrating the inner tube is greatly reduced, as it is well understood that the inner tube must necessarily be formed of flexible material and consequently it is of importance that the spreader plate be either plated with non-corrosive material or formed of highly non-corrosive material and by forming the plate of highly non-corrosive material the necessity of plating is dispensed with, thereby reducing the cost of production and at the same time dispensing with a separate contact plate or disk.

Having fully described my invention what I claim as new and desire to secure by Letters Patent, is—

As an improved article of manufacture, a combined spreader and clamp plate, the longitudinal edges adapted for contact with the inner face of the tire, said plate curved longitudinally and the inner face provided with concentric ribs and grooves, the outermost rib of the series of concentric ribs formed of greater height than the remaining concentric ribs of the series, all arranged, substantially as and for the purpose specified.

In testimony that I claim the above, I have hereunto subscribed my name in the presence of two witnesses.

SOLOMON E. NOLD.

Witnesses:
JOHN H. BISHOP,
F. W. BOND.

Copies of this patent may be obtained for five cents each, by addressing the "Commissioner of Patents, Washington, D. C."